(12) United States Patent
Feng et al.

(10) Patent No.: US 10,993,208 B2
(45) Date of Patent: Apr. 27, 2021

(54) CHANNEL MEASUREMENT AND MEASUREMENT RESULT REPORTING METHOD AND DEVICE

(71) Applicant: GUANGDONG OPPO MOBILE TELECOMMUNICATIONS CORP., LTD., Guangdong (CN)

(72) Inventors: Bin Feng, Guangdong (CN); Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 15/745,298

(22) PCT Filed: Sep. 10, 2015

(86) PCT No.: PCT/CN2015/089392
§ 371 (c)(1),
(2) Date: Jan. 16, 2018

(87) PCT Pub. No.: WO2017/041274
PCT Pub. Date: Mar. 16, 2017

(65) Prior Publication Data
US 2019/0014553 A1 Jan. 10, 2019

(51) Int. Cl.
*H04W 72/02* (2009.01)
*H04W 72/04* (2009.01)
(Continued)

(52) U.S. Cl.
CPC ....... *H04W 72/02* (2013.01); *H04W 72/0453* (2013.01); *H04W 72/085* (2013.01); *H04W 88/02* (2013.01)

(58) Field of Classification Search
CPC ... H04W 72/02; H04W 88/02; H04W 72/085; H04W 72/0453; H04W 24/10
See application file for complete search history.

(56) References Cited

U.S. PATENT DOCUMENTS

2002/0141331 A1* 10/2002 Mate ................. H04W 72/1273
370/218
2003/0003895 A1* 1/2003 Wallentin ................ H04L 63/08
455/410
(Continued)

FOREIGN PATENT DOCUMENTS

CN 101453695 A 6/2009
CN 101873702 A 10/2010
(Continued)

OTHER PUBLICATIONS

CN 104579518 A—English Abstract.
(Continued)

*Primary Examiner* — Gregory B Sefcheck
*Assistant Examiner* — Joshua Smith

(57) ABSTRACT

Embodiments provide a channel measurement and measurement result reporting method and device. According to the method, terminal equipment measures a channel of an unlicensed frequency band according to configuration information, wherein the terminal equipment is in an idle state. The terminal equipment transmits a measurement result of the unlicensed frequency band to network equipment. When the network equipment is required to configure the channel of the unlicensed frequency band to be a secondary carrier of the terminal equipment, the number of interaction signalings between the terminal equipment and the network equipment may be reduced, thereby reducing signaling overhead, and increasing an access rate and access efficiency of an unlicensed frequency band channel carrier.

19 Claims, 13 Drawing Sheets

(51) Int. Cl.
*H04W 72/08* (2009.01)
*H04W 88/02* (2009.01)

(56) References Cited

U.S. PATENT DOCUMENTS

| | | | |
|---|---|---|---|
| 2004/0147266 A1* | 7/2004 | Hwang | H04W 72/005 455/445 |
| 2004/0185785 A1* | 9/2004 | Mir | H04L 1/0014 455/67.11 |
| 2008/0045213 A1 | 2/2008 | Norris et al. | |
| 2009/0268654 A1* | 10/2009 | Baglin | H04W 48/18 370/311 |
| 2011/0269463 A1* | 11/2011 | Wang | H04W 52/0232 455/436 |
| 2012/0039284 A1* | 2/2012 | Barbieri | H04W 48/10 370/329 |
| 2012/0250558 A1* | 10/2012 | Chung | H04L 1/0026 370/252 |
| 2013/0051214 A1 | 2/2013 | Fong | |
| 2013/0235738 A1* | 9/2013 | Siomina | H04W 24/00 370/252 |
| 2014/0056169 A1* | 2/2014 | Jung | H04W 24/08 370/252 |
| 2014/0228016 A1* | 8/2014 | Futaki | H04W 36/0055 455/422.1 |
| 2014/0295847 A1* | 10/2014 | Futaki | H04W 36/0083 455/436 |
| 2015/0146599 A1* | 5/2015 | Jha | H04W 72/048 370/311 |
| 2015/0249933 A1 | 9/2015 | Huang et al. | |
| 2015/0289252 A1* | 10/2015 | Uchino | H04L 69/14 370/329 |
| 2015/0312894 A1* | 10/2015 | Chen | H04W 16/18 370/329 |
| 2015/0341815 A1* | 11/2015 | Kim | H04W 72/042 370/252 |
| 2015/0373740 A1* | 12/2015 | Eriksson | H04W 74/0833 370/329 |
| 2016/0066204 A1* | 3/2016 | Khawer | H04W 72/085 455/500 |
| 2016/0249224 A1* | 8/2016 | Prasad | H04W 16/14 |
| 2016/0286419 A1* | 9/2016 | Liu | H04W 24/10 |
| 2016/0330641 A1 | 11/2016 | Zhang et al. | |
| 2016/0374005 A1* | 12/2016 | Cho | H04W 48/06 |
| 2017/0156075 A1* | 6/2017 | Harada | H04W 16/14 |
| 2017/0171764 A1* | 6/2017 | Dimou | H04W 4/70 |
| 2018/0220303 A1* | 8/2018 | Futaki | H04W 48/18 |
| 2018/0249361 A1* | 8/2018 | Otsuki | H04W 16/18 |

FOREIGN PATENT DOCUMENTS

| | | |
|---|---|---|
| CN | 102149106 A | 8/2011 |
| CN | 102149195 A | 8/2011 |
| CN | 102685671 A | 9/2012 |
| CN | 102781021 A | 11/2012 |
| CN | 103491523 A | 1/2014 |
| CN | 104486792 A | 4/2015 |
| CN | 104540158 A | 4/2015 |
| CN | 104579518 A | 4/2015 |
| CN | 104812012 A | 7/2015 |
| EP | 3091778 A1 | 11/2016 |
| EP | 3251402 A1 | 12/2017 |
| JP | 2009540722 A | 11/2009 |
| JP | 2013534395 A | 9/2013 |
| JP | 2014131329 A | 7/2014 |
| WO | 2013047833 A1 | 4/2013 |
| WO | 2014019217 A1 | 2/2014 |
| WO | 2015109516 A1 | 7/2015 |
| WO | 2016123568 A1 | 8/2016 |

OTHER PUBLICATIONS

CN 101873702 A—English Abstract.
CN 103491523 A—English Abstract.
CN 104812012 A—English Abstract.
English Translation of the Written Opinion of the International Search Authority in international application No. PCT/CN2015/089392, dated May 27, 2016.
ETRI, Scenarios and Requirements for LAA [online], 3GPP TSG RAN WG2 #89 R2-150234, the Internet <URL: http: //www.3gpp.org/ftp/tsg_ran/WG2_RL2/TSGR2_89/docs/R2-150234.zip>, Jan. 31, 2015.
OPPO, Discussion on RSSI Reporting [online], 3GPP TSG-RAN2 Meeting #91 R2-153196,the internet <URL: http: //www.3gpp.org/ftp/tsg_ran/WG2_RL2/TSGR2_91/docs/R2-153196.zip>, Aug. 13, 2015.
Samsung:"Discussion on CSI measurement and reporting and LAA",3GPP Draft; R1-152868 CSI for LAA, 3rd Generation Partnership Project (3GPP), Mobile Competence Centere ;650, Route Des Lucioles ; F-06921 Sophia-Antipolis Cedex ;France,vol. RAN WG1, No. Fukuoka, Japan; May 25, 2015-May 29, 2015 May 16, 2015(May 16, 2015), XP050972363,Retrieved from the Internet:URL:http://www.3gpp.org/ftp/tsg_ran/WG1_RL1/TSGR1_81/Docs/.
Kyocera:"RRM measurements for carrier selection",3GPP Draft; R1-154008_LAA_RRM, 3rd Generation Partnership Project (3GPP), Mobile Competence Centre ;650, Route Des Lucioles : F-06921 Sophia-Antipolis Cedex ;France,vol. RAN WG1, No. Beijing, China; Aug. 24, 2015-Aug. 28, 2015 Aug. 23, 2015 (Aug. 23, 2015), XP051039377,Retrieved from the Internet:URL:http://www.3gpp.org/ftp/Meetings_3GPP_SYNC/RAN1/Docs/.
NEC:"Valid measurement samples to RRC" 3GPP Draft; R1-154363_LAA Valid MEAS to RRC, 3rd Generation Partnership Project (3GPP), Mobile Competence Centre ; 650, Route Des Lucioles ; F-06921 Sophia-Antipolis Cedex ; France,vol. RAN WG1, No. Beijing, China; Aug. 24, 2015-Aug. 28, 2015 Aug. 14, 2015 (Aug. 14, 2015), XP050993431,Retrieved from the Internet:URL:http://www.3gpp.org/ftptsg_ran/WG1_RL1/TSG R1_82/Docs/.
Supplementary European Search Report in the European application No. 15903381.0, dated Jan. 28, 2019.
Second Office Action of the Japanese application No. 2018-507575, dated Feb. 4, 2020.
Decision of Rejection of the Japanese application No. 2018-507575, dated Oct. 2, 2020.
First Office Action of the European application No. 15903381.0, dated Jul. 1, 2020.
Huawei, HiSilicon, "Considerations of Measurement Issues in LAA", 3GPP TSG-RAN WG2 Meeting #91 R2-153311, Beijing, China, Aug. 24-28. 2015.
Ericsson, "RSSI measurement reporting for LAA", 3GPP TSG-RAN WG2 #91 Tdoc R2-153659, Beijing, P.R. China, Aug. 24-28, 2015.
Samsung, "Scope, characteristics and high level design of RSSI measurement", 3GPP TSG-RAN2#91 meeting Tdoc R2-153666, Beijing, P.R. China, Aug. 24-28, 2015.
First Office Action of the Indian application No. 201817012725, dated Jan. 27, 2020.
First Office Action of the Japanese application No. 2018-507575, dated May 10, 2019.

* cited by examiner

100

| Terminal equipment measures a channel of an unlicensed frequency band according to configuration information, wherein the terminal equipment is in an idle state | ~ S110 |

| The terminal equipment transmits a measurement result of the unlicensed frequency band to network equipment | ~ S120 |

| Network equipment transmits configuration information to terminal equipment | ～ S410 |

| The network equipment receives a measurement result of an unlicensed frequency band by the terminal equipment in an idle state according to the configuration information | ～ S420 |

```
┌─────────────────────────────────────────────────────┐
│ First indication information indicating that terminal│──── S421
│ equipment stores a measurement result is received   │
│ from the terminal equipment                          │
└─────────────────────────────────────────────────────┘
                         │
┌─────────────────────────────────────────────────────┐
│ Second indication information is transmitted to the │
│ terminal equipment, the second indication information│──── S422
│ being configured to indicate the terminal equipment to│
│ report the measurement result                        │
└─────────────────────────────────────────────────────┘
                         │
┌─────────────────────────────────────────────────────┐
│ The measurement result transmitted by the terminal  │──── S423
│ equipment according to the second indication information│
│ is received                                          │
└─────────────────────────────────────────────────────┘
```

FIG. 7

CHANNEL MEASUREMENT AND MEASUREMENT RESULT REPORTING METHOD AND DEVICE

RELATED APPLICATION

This application is a national phase entry under 35 USC 371 of International Patent Application No.: PCT/CN2015/089392 filed on 10 Sep. 2015, the disclosure of which is incorporated in its entirety by reference herein.

TECHNICAL FIELD

The disclosure relates to communications, and particularly to a channel measurement and measurement result reporting method and device.

BACKGROUND

In a conventional wireless cellular communication system, a measurement mechanism plays a very important role in idle-state cell selection and reselection, connected-state handover and network planning and optimization. Measured quantities mainly include Reference Signal Received Power (RSRP) and Reference Signal Received Quality (RSRQ). In an idle state, a terminal determines whether to continue camping in a cell or not or whether it is necessary to reselect a neighbor cell of the same frequency or a different frequency or not under a configuration provided by system information based on RSRP and RSRQ measurement results of the camping cell and the neighbor cell. In such a process, the terminal is not required to report the measurement results to the network side. In a connected state, the terminal performs event-triggered or periodical measurement result reporting under a dedicated signaling configuration of the system, and a network side (such as a base station) performs handover or addition or deletion of a secondary carrier/cell during carrier aggregation/dual connectivity according to the reported results.

At present, it is considered to use an unlicensed frequency band (for example, 2.4 GHz or 5.8 GHz) to extend the frequency for wireless cellular system, and two methods are mainly adopted, i.e. License Assisted Access (LAA) and Long Term Evolution (LTE)/Wireless Fidelity (WiFi) Aggregation. The two methods mainly have the following characteristics: (1) an aggregated resource belongs to unlicensed frequency band, and is only used as complementary resources for the licensed frequency band: and (2) use of the unlicensed frequency band is limited not only by scheduling of a base station, but also limited by a load of the frequency band, and namely, the unlicensed frequency band may be used through a competition mechanism. Therefore, compared with the licensed frequency band, the unlicensed frequency band is required to be measured by the terminal as timely as possible, so that the resource of the unlicensed frequency band may be fully utilized, and the terminal may access the unlicensed frequency band as fast as possible.

When a conventional manner is adopted, if a terminal is in a connected state, when the terminal or a network generates a service (for example, a File Transfer Protocol (FTP) service) suitable for transmission on an unlicensed frequency band, the network configures the terminal to perform unlicensed frequency band channel measurement in the conventional manner, the terminal reports according to network configuration, and the network determines whether to configure the corresponding frequency band to the terminal or not according to a reporting result. However, if the terminal is in an idle state, when the terminal or the network generates the sendee (for example, the FTP service) suitable for transmission on the unlicensed frequency band, the terminal is required to enter the connected state in a licensed frequency band and perform unlicensed frequency band measurement by configuration. After measurement and reporting by the terminal, the network determines whether to configure a certain channel of the unlicensed frequency band to the terminal as an LAA secondary carrier or a LTE/WiFi aggregation carrier or not.

Thus it can be seen that, if the unlicensed frequency band channel is required to be configured as an LAA secondary carrier or a LTE/WiFi aggregation carrier, a terminal is required to access a licensed frequency band at first and perform measurement and reporting after configuration in the licensed frequency band, and then a base station may finally configure the carrier to the terminal. Therefore, a configuration procedure may be too long. Measurement and reporting of the corresponding carrier may be completed only after the configuration from the network. Moreover, a measurement and reporting latency is longer, particularly for an idle-state terminal or for a terminal performing handover, in configuration of the LAA secondary carrier or the LTE/WiFi aggregation carrier.

SUMMARY

The disclosure provides a channel measurement and measurement result reporting method and device, which may reduce the number of interaction signalings between terminal equipment and network equipment, reduce signaling overhead and increase an access rate and access efficiency of an unlicensed frequency band channel carrier when the network equipment is required to configure a channel of an unlicensed frequency band to be a secondary carrier of the terminal equipment.

A first aspect provides a channel measurement and measurement result reporting method, including that terminal equipment measures a channel of an unlicensed frequency band according to configuration information, wherein the terminal equipment is in an idle state. The terminal equipment transmits a measurement result of the unlicensed frequency band to network equipment.

A second aspect provides a channel measurement and measurement result reporting method, including that network equipment transmits configuration information to terminal equipment and receives a measurement result of an unlicensed frequency band by the terminal equipment in an idle state according to the configuration information.

A third aspect provides terminal equipment, including a processing module, configured to measure a channel of an unlicensed frequency band according to configuration information, wherein the terminal equipment is in an idle state; and a transceiver module, configured to transmit a measurement result of the unlicensed frequency band to network equipment.

A fourth aspect provides network equipment, including a transmission module, configured to transmit configuration information to terminal equipment; and a receiving module, configured to receive a measurement result of an unlicensed frequency band by the terminal equipment in an idle state according to the configuration information.

Erased on the abovementioned technical characteristics, according to the channel measurement and measurement result reporting method and device provided by embodiments of the disclosure, the terminal equipment in the idle state measures the channel of the unlicensed frequency band according to the configuration information, and transmits the measurement result of the unlicensed frequency band to the network equipment. When the network equipment is required to configure the channel of the unlicensed frequency band to be a secondary carrier of the terminal equipment, the number of interaction signalings between the terminal equipment and the network equipment may be reduced, thereby reducing signaling overhead, and increasing an access rate and access efficiency of an unlicensed frequency band channel carrier.

BRIEF DESCRIPTION OF DRAWINGS

In order to describe the technical solutions of the embodiments of the disclosure more clearly, the drawings required to be used for descriptions about the embodiments or a conventional art will be simply introduced below. Apparently, the drawings described below are only some embodiments of the disclosure. For those skilled in the art, other drawings may further be obtained according to these drawings without creative work.

FIG. 1 is a schematic flowchart of a channel measurement and measurement result reporting method according to an embodiment of the disclosure.

FIG. 6 is a schematic flowchart of a channel measurement and measurement result reporting method according to still another embodiment of the disclosure.

FIG. 7 is another schematic flowchart of a channel measurement and measurement result reporting method according to still another embodiment of the disclosure.

DETAILED DESCRIPTION

Figure 2:
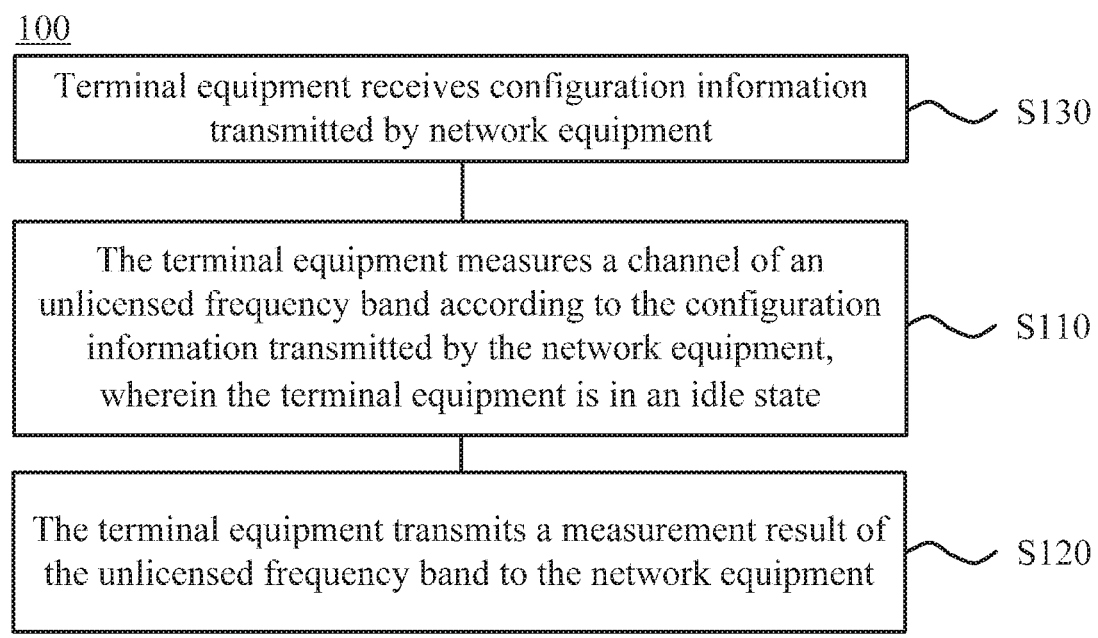
FIG. 2 is another schematic flowchart of a channel measurement and measurement result reporting method according to an embodiment of the disclosure.

The technical solutions in the embodiments of the disclosure will be clearly and completely described below in combination with the drawings in the embodiments of the disclosure. Apparently, the described embodiments are not all embodiments but part of embodiments of the disclosure. All other embodiments obtained by those skilled in the art based on the embodiments in the disclosure without creative work fall within the scope of protection of the disclosure.

It should be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) General Packet Radio Service (GPRS) system, an LTE system, an LTE Frequency Division Duplex (FDD) system, LTE Time Division Duplex (TDD), a Universal Mobile Telecommunication System (UMTS) and a future 5th-Generation (5G) communication system.

It should be understood that, in the embodiments of the disclosure, terminal equipment may also be called user equipment, a Mobile Station (MS), a mobile terminal and the like. The user equipment may communicate with one or more core networks through a Radio Access Network (RAN). For example, the user equipment may be a mobile phone (or called a "cell" phone) and a computer with a mobile terminal, and for example, may be a portable, pocket, handheld, in-computer or vehicle-mounted mobile device, and terminal equipment in a future 5G network or terminal equipment in a future evolved Public Land Mobile Network (PLMN).

It should also be understood that, in the embodiments of the disclosure, network equipment may be equipment configured to communicate with the user equipment, the network equipment may be a Base Transceiver Station (BTS) in a GSM or CDMA, may also be a NodeB (NB) in a WCDMA system, and may further be an Evolutional NodeB (eNB or eNodeB) in an LTE system, or the network equipment may be a relay station, an access point, vehicle-mounted equipment, wearable equipment, network-side equipment in a future 5G network or network equipment in a future evolved PLMN and the like.

It is noted that, in the embodiments of the disclosure, an ordinary licensed frequency band refers to a frequency band which is exclusively used by a specific system or a specific operating company, and the ordinary licensed frequency band may also be called a "licensed frequency band" or an "authorized frequency band". The unlicensed frequency band refers to a frequency band free and open to the public and shared by different systems, and the unlicensed frequency band may also be called an "unauthorized frequency band" (for example, a 2.4 GHz frequency band and a 5.8 GHz frequency band). However, the scope of protection of the embodiments of the disclosure is not limited to these names.

In the embodiments of the disclosure, both the network equipment and the terminal equipment may support LAA and WiFi secondary carrier addition, modification and deletion functions.

FIG. 1 is a schematic flowchart of a channel measurement and measurement result reporting method according to an embodiment of the disclosure. The method may be executed by terminal equipment, and as shown in FIG. 1, the method 100 includes the following operations.

In S110, terminal equipment measures a channel of an unlicensed frequency band according to configuration information, wherein the terminal equipment is in an idle state.

In S120, the terminal equipment transmits a measurement result of measuring the channel of the unlicensed frequency band to network equipment.

Therefore, in the embodiment of the disclosure, the terminal equipment in the idle state measures the channel of the unlicensed frequency band according to the configuration information, and reports the measurement result to the network equipment. In such a manner, when the network equipment is required to configure the channel of the unlicensed frequency band to be a secondary carrier of the terminal equipment, the number of interaction signalings between the terminal equipment and the network equipment may be reduced, thereby reducing signaling overhead and increasing an access rate and access efficiency of an unlicensed frequency band channel carrier.

It should be understood that, in the embodiment of the disclosure, a connected state refers to a state that the terminal equipment establishes a Radio Resource Control (RRC) connection with the network equipment, and the idle state refers to a state that the terminal equipment establishes no RRC connection with the network equipment.

Optionally, in S110, the configuration information may be transmitted to the terminal equipment by the network equipment, and may also be its own default configuration information of the terminal equipment. The default configuration information may be a latest configuration automatically recorded by the terminal equipment. The terminal equipment may use the same configuration for measurement in different channel measurement processes under the condition that a cell where the terminal equipment is located does not change.

Optionally, as shown in FIG. 2, the method 100 further includes the following operation.

In S130, the terminal equipment receives the configuration information transmitted by the network equipment.

Correspondingly, S110 is specifically implemented as follows. The channel of the unlicensed frequency band is measured according to the received configuration information transmitted by the network equipment.

Optionally, in S130, the terminal equipment may receive a broadcast message transmitted by the network equipment, the broadcast message including the configuration information.

Optionally, the broadcast message may be a broadcast message contained in a Master Information Block (MIB), or is called an MIB message. The broadcast message may also be a broadcast message contained in a System Information Block (SIB), or is called an SIB message. The broadcast message may further be another broadcast message, and there are no limits made in the disclosure.

Preferably, the broadcast message is an SIB message. The network equipment may implement inclusion of the configuration information in the SIB message in a manner of adding an Information Element (IE) into an SIB message in the conventional art. For example, an IE corresponding to the configuration information may be added into existing SIB1 or SIB/3/4/5. A new SIB message different from the SIB message in the conventional art may also be introduced, and the new SIB message includes the IE corresponding to the configuration information.

Optionally, if the terminal equipment is in the connected state, the terminal equipment may receive an RRC connection release message transmitted by the network equipment, the RRC connection release message including the configuration information. Moreover, when the terminal equipment receives the RRC connection release message, the RRC connection is released, a state of the terminal equipment is switched from the connected state to the idle state, and then the terminal equipment in the idle state measures the channel of the unlicensed frequency band according to a configuration of the received configuration information. In such a possible implementation mode, if the configuration information only includes parameter information related to channel measurement, for example, frequency point information and measurement period information, the network equipment is also required to transmit a network capability information indicating whether the network equipment supports an LAA and/or LTE/WiFi aggregation function or not to the terminal equipment.

In the embodiment of the disclosure, optionally, the configuration information is configured to indicate that the network equipment supports an LAA function, and/or, an LTE and WiFi aggregation function. That is, if the configuration information transmitted by the network equipment only indicates a capability of the network equipment, when the network equipment supports the LAA function and/or the LTE/WiFi aggregation function, the terminal equipment may measure the channel of the unlicensed frequency band according to a default configuration stored therein, and the default configuration stored by the terminal equipment may include the frequency information, measurement period information, measurement parameter information and the like configured by the terminal equipment based on implementation. For example, the terminal equipment determines that an unlicensed frequency band to be measured is 5.8 GHz, a measurement period is several seconds and a measurement duration is several milliseconds based on its own implementation. However, during channel measurement, according to the default configuration stored therein, the practically measured unlicensed frequency band is 5.1 GHz, the measurement period is several seconds, and the measurement duration is several milliseconds.

Optionally, in S110, the configuration information includes at least one of the following information: the frequency information of the unlicensed frequency band, the measurement period information, measurement duration information and the measurement parameter(s).

Specifically, the terminal equipment correspondingly measures a measurement parameter in the measurement duration on a frequency indicated in the indication information according to the measurement period in the configuration information, and records a measurement result. The terminal equipment may cover an original measurement result with a new measurement result after completing a measurement.

Optionally, the measurement periods indicated by the measurement period information may be the same, and may also be different. The measurement duration corresponding to each measurement or each measurement period may be the same, and may also be different. That is, each measurement period may include a variable measurement duration. For example, the measurement period may be configured according to a priority of a service or a channel load condition. If the priority of the service is higher or the load is lower, the measurement period may be set to be shorter. If the priority of the service is lower or the load is higher, the measurement period may be set to be longer. The measurement duration may also be configured according to a similar rule. If a previous measurement result condition obtained by the terminal equipment is clear, for example, a Received Signal Strength Indicator (RSSI) is far higher than or lower than a threshold value, the terminal equipment may use a shorter measurement duration. If the previous measurement result condition obtained by the terminal equipment is poor, that is, the channel is more complicated, for example, the RSSI is approximate to the threshold value, the measurement duration may be correspondingly extended.

Optionally, the measurement parameter information includes at least one of the following parameters: RSRP, RSRQ and an RSSI. However, the disclosure is not limited.

Optionally, the terminal equipment may directly report the measurement result to the network equipment after completing measurement, and may also notify the network equipment of information indicating that it stores the measurement result and then report the measurement result when the network equipment requires the terminal equipment to report the measurement result.

In the embodiment of the disclosure, optionally, the terminal equipment may transmit the measurement result to the network equipment through dedicated signaling in a process of establishing the RRC connection with the network equipment. For example, the terminal equipment may transmit an RRC connection establishment request message or an RRC connection establishment completion message to the network equipment, the RRC connection establishment request message or the RRC connection establishment completion message including the measurement result.

Figure 3:
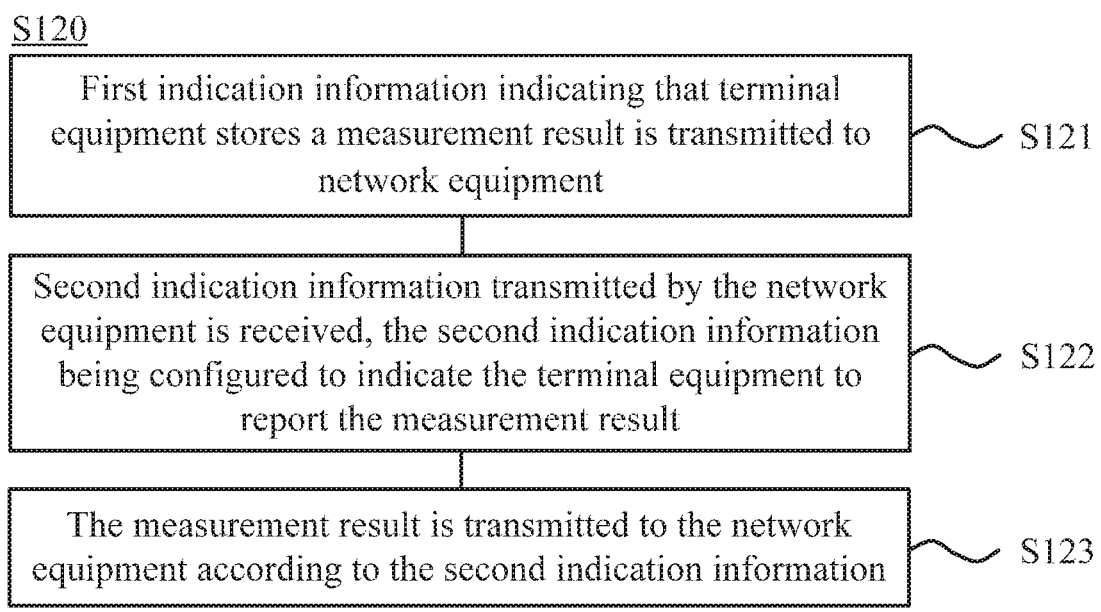
FIG. 3 is yet another schematic flowchart of a channel measurement and measurement result reporting method according to an embodiment of the disclosure.

In the embodiment of the disclosure, optionally, the terminal equipment may notify the network equipment of the information indicating that it stores the measurement result. For example, as shown in FIG. 3, S120 may specifically include the following operations.

In S121, first indication information indicating that the terminal equipment stores the measurement result is transmitted to the network equipment.

In S122, second indication information transmitted by the network equipment is received, the second indication information being configured to indicate the terminal equipment to report the measurement result.

In S123, the measurement result is transmitted to the network equipment according to the second indication information.

Specifically, the terminal equipment may include the first indication information in the RRC connection establishment request message transmitted to the network equipment. The network equipment may learn about that the terminal equipment has stored the measurement result of the unlicensed frequency band after receiving the RRC connection establishment request message, and includes the indication information indicating the terminal equipment to report the measurement result in an RRC connection establishment message transmitted to the terminal equipment when the network equipment requires the terminal equipment to report the measurement result. The terminal equipment may include the measurement result in the RRC connection establishment completion message transmitted to the network equipment.

If the terminal equipment does not include the first indication information indicating that it stores the measurement result in the RRC connection establishment request message, the terminal equipment may include the first indication information indicating that it stores the measurement result in the RRC connection establishment completion message. The network equipment may include the indication information indicating the terminal equipment to report the measurement result in an RRC reconfiguration message or include the indication information indicating the terminal equipment to report the measurement result in a terminal equipment specific (or terminal dedicated) message after establishment of the RRC connection is completed. Then, the terminal equipment may include the measurement result in an RRC reconfiguration completion message or terminal equipment specific message transmitted to the network equipment.

Optionally, S121 may specifically be implemented as follows. The RRC connection establishment request message is transmitted to the network equipment, the RRC connection establishment request message including the first indication information. Correspondingly, S122 is implemented as follows. An RRC connection establishment message transmitted by the network equipment is received, the RRC connection establishment message including the second indication information. S123 is implemented as follows. The RRC connection establishment completion message is transmitted to the network equipment, the RRC connection establishment completion message including the measurement result.

Optionally, S121 may specifically be implemented as follows. The RRC connection establishment completion message is transmitted to the network equipment, the RRC connection establishment completion message including the first indication information. Correspondingly, S122 is implemented as follows. An RRC reconfiguration message transmitted by the network equipment is received, the RRC reconfiguration message including the second indication information. S123 is implemented as follows. An RRC reconfiguration completion message is transmitted to the network equipment, the RRC reconfiguration completion message including the measurement result.

Optionally, if the second indication information transmitted to the terminal equipment by the network equipment in S122 is included in the terminal equipment specific message, the terminal equipment may correspondingly transmit a terminal equipment dedicated message to the network equipment in S123, the terminal equipment dedicated message including the measurement result. Alternatively, the terminal equipment may communicate with the network equipment through the terminal equipment dedicated message after entering the connected state. The terminal equipment may include the indication information indicating that it stores the measurement result or the measurement result in the terminal equipment dedicated message for transmitting to the network equipment. For example, the terminal equipment dedicated message may be an unlicensed frequency band measurement reporting message, but the scope of protection of the disclosure is not limited to this name. In the embodiment of the disclosure, optionally, the terminal equipment may determine whether LAA secondary carrier configuration or WiFi secondary carrier configuration is required or not according to a service requirement, and transmit the measurement result to the network equipment when determining that LAA secondary carrier configuration or WiFi secondary carrier configuration is required.

In other words, the terminal equipment may determine whether it is necessary to report the measurement result to the network equipment or not according to the service requirement. If the terminal equipment does not generate a service suitable for transmission on the unlicensed frequency band, the terminal equipment may select not to report the measurement result. If the terminal equipment generates the service (for example, an FTP service) suitable for transmission on the unlicensed frequency band, the terminal equipment determines that the measurement result is required to be transmitted to the network equipment. At this moment, the terminal equipment may directly report the measurement result to the network equipment, and may also notify the network equipment of the information indicating that it stores the measurement result at first and then transmit the measurement result to the network equipment after receiving a message indicating the terminal equipment to transmit the measurement result from the network equipment.

In such a manner, the network equipment may configure the terminal equipment to use the unlicensed frequency band secondary carrier in an LAA or a WiFi manner according to the service requirement after receiving the measurement result transmitted by the terminal equipment.

A wireless communication method according to the embodiment of the disclosure will be described below in detail in combination with specific embodiments. It is noted that these examples are not intended to limit the scope of the embodiments of the disclosure but only to help those skilled in the art to better understand the embodiments of the disclosure.

Figure 4:
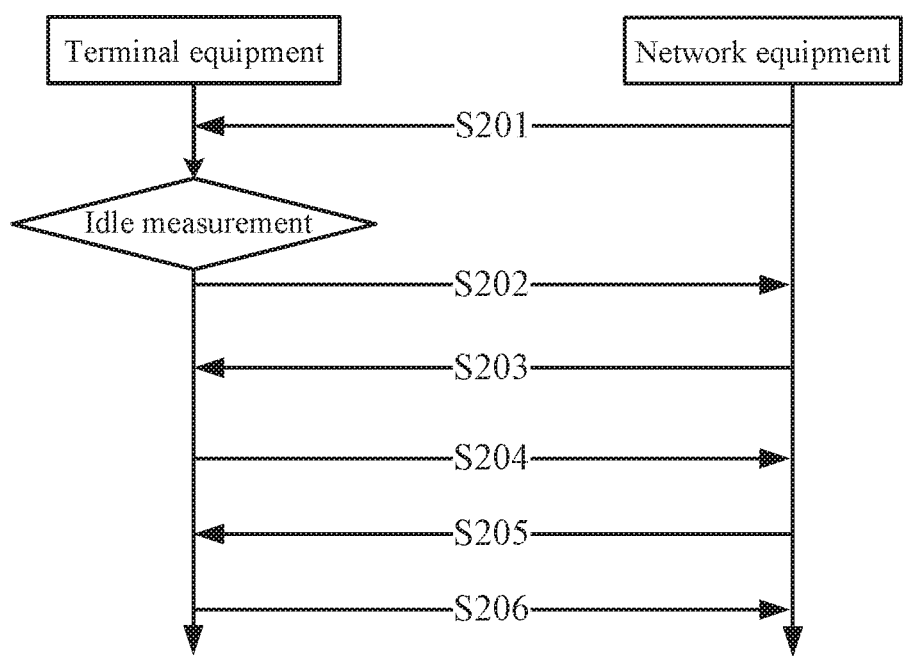
FIG. 4 is a schematic flowchart of a channel measurement and measurement result reporting method according to yet another embodiment of the disclosure.

FIG. 4 is a schematic flowchart of a channel measurement and measurement result reporting method according to another embodiment of the disclosure. As shown in FIG. 4, the method 200 includes the following operations.

In S201, a base station eNB transmits a system information configuration message to terminal equipment UE in an idle state.

The system information configuration message may include measurement configuration information and/or a network capability information, wherein the measurement configuration information may include information such as frequency information of an unlicensed frequency band, a measurement period, a measurement duration and a measurement parameter, and the network capability information is configured to indicate whether the eNB supports an LAA function, and/or, an LTE and WiFi aggregation function or not. The UE measures the channel of the unlicensed frequency band according to the received system information configuration message.

In S202, the UE transmits an RRC connection establishment request message to the eNB.

The RRC connection establishment request message may include indication information indicating that the UE stores a measurement result.

In S203, the eNB transmits an RRC connection establishment message to the UE.

In S204, the UE transmits an RRC connection establishment completion message to the eNB.

If the RRC connection establishment request message transmitted to the eNB by the UE in S202 does not include the indication information indicating that it stores the measurement result, the UE may add the indication information indicating that it stores the measurement result in the RRC connection establishment completion message, or the UE directly carries the measurement result in the RRC connection establishment request message or the RRC connection establishment completion message for reporting to the eNB.

After the UE and the eNB establish an RRC connection, the method 200 may further include the following operations.

In S205, the eNB transmits an RRC reconfiguration message to the UE.

In S206, the UE transmits an RRC reconfiguration completion message to the eNB.

The RRC reconfiguration completion message may include the indication information indicating that it stores the measurement result or the measurement result.

Figure 5:
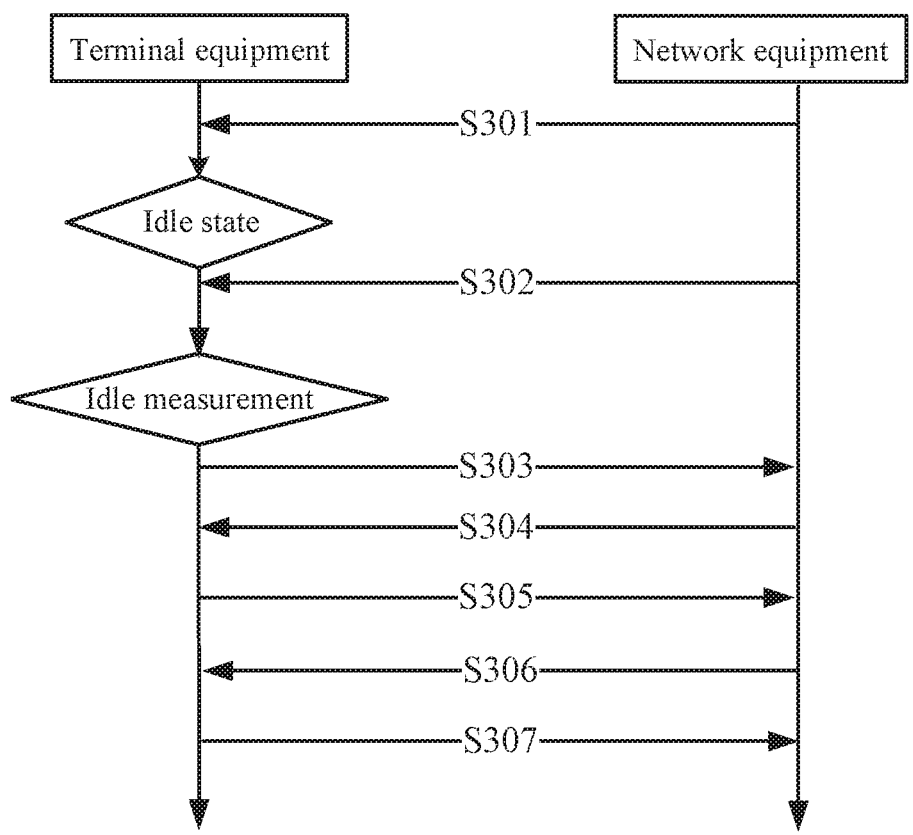
FIG. 5 is a schematic flowchart of a channel measurement and measurement result reporting method according to still another embodiment of the disclosure.

FIG. 5 is a schematic flowchart of a channel measurement and measurement result reporting method according to another embodiment of the disclosure. As shown in FIG. 5, the method 300 includes the following operations.

In S301, UE in a connected state receives dedicated signaling of RRC connection release and the like from an eNB.

The dedicated signaling includes measurement configuration information, the UE in the connected state releases an RRC connection after receiving the dedicated signaling, and its state is switched from the connected state into an idle state.

In S302, the UE in an idle state receives a system information configuration message transmitted by the eNB.

The system information configuration message includes network capability indication information.

In S303, the UE in the idle state transmits an RRC connection establishment request message to the eNB, In S304, the eNB transmits an RRC connection establishment message to the UE in the idle state.

In S305, the UE in the connected state transmits an RRC connection establishment completion message to the eNB.

After the UE transmits the RRC connection establishment completion message to the eNB, the UE establishes the RRC connection with the eNB. At this moment, the state of the UE is switched from the idle state to the connected state.

In S306, the UE in the connected state receives an RRC reconfiguration message transmitted by the eNB.

In S307, the UE in the connected state transmits an RRC reconfiguration completion message to the eNB.

It should be understood that information included in the messages in the method 300 may be the same as the information included in the related messages in the method 200, which will not be elaborated herein for convenience.

It should also be understood that the method 300 may also not include S302, At this moment, network capability information may be included in the dedicated signaling transmitted in S301.

Therefore, in the embodiment of the disclosure, terminal equipment in an idle state measures a channel of an unlicensed frequency band according to configuration information, and reports a measurement result to network equipment. In such a manner, when the network equipment is required to configure the channel of the unlicensed frequency band to be a secondary carrier of the terminal equipment, the number of interaction signalings between the terminal equipment and the network equipment may be reduced, thereby reducing signaling overhead, and increasing an access rate and access efficiency of an unlicensed frequency band channel carrier.

The channel measurement and measurement result reporting methods according to the embodiments of the disclosure are described above in detail from a terminal equipment side in combination with FIG. 1 to FIG. 5. The channel measurement and measurement result reporting methods according to other embodiments of the disclosure will be described below in detail from a network equipment side in combination with FIG. 6 to FIG. 8. It should be understood that interaction between network equipment and terminal equipment, related characteristics and functions and the like described on the terminal equipment side correspond to descriptions on the network equipment side. For simplicity, repeated descriptions are properly eliminated.

FIG. 6 is a schematic flowchart of a channel measurement and measurement result reporting method according to another embodiment of the disclosure. The method may be executed by network equipment, and as shown in FIG. 6, the method 400 includes the following operations.

In S410, the network equipment transmits configuration information to terminal equipment.

In S420, the network equipment receives a measurement result of an unlicensed frequency band by the terminal equipment in an idle state according to the configuration information.

Therefore, in the embodiment of the disclosure, the network equipment transmits the configuration information to the terminal equipment, and receives the measurement result of the unlicensed frequency band by the terminal equipment in the idle state according to the configuration information.

Since the terminal equipment in the idle state may measure the channel of the unlicensed frequency band, when the network equipment is required to configure the channel of the unlicensed frequency band to be a secondary carrier of the terminal equipment, the number of interaction signalings between the terminal equipment and the network equipment may be reduced, thereby reducing signaling overhead, and increasing an access rate and access efficiency of an unlicensed frequency band channel carrier.

Optionally, S410 may be implemented as follows, A broadcast message is transmitted to the terminal equipment, the broadcast message including the configuration information.

Optionally, in S410, the broadcast system is an SIB message.

Optionally, S410 may be implemented as follows. An RRC connection release message is transmitted to the terminal equipment, the RRC connection release message including the configuration information.

Optionally, in S410, the configuration information is configured to indicate that the network equipment supports an LAA function, and/or, an LIE and WiFi aggregation function.

Optionally, in S410, the configuration information includes at least one of the following information; frequency information of the unlicensed frequency band, measurement period information, measurement duration information and measurement parameter(s).

In the embodiment of the disclosure, optionally, the measurement parameter information includes at least one of the following parameters: RSRP, RSRQ and an RSSI.

Optionally, S420 may be implemented as follows. An RRC connection establishment request message or RRC connection establishment completion message transmitted by the terminal equipment is received, the RRC connection establishment completion message including the measurement result.

Optionally, as shown in FIG. 7, S420 includes the following operations.

In S421, first indication information indicating that the terminal equipment stores the measurement result is received from the terminal equipment.

In S422, second indication information is transmitted to the terminal equipment, the second indication information being configured to indicate the terminal equipment to report the measurement result.

In S423, the measurement result transmitted by the terminal equipment according to the second indication information is received.

Optionally, S421 may be implemented as follows. The RRC connection establishment request message transmitted by the terminal equipment is received, the RRC connection establishment request message including the first indication information.

Correspondingly, S422 is implemented as follows. An RRC connection establishment message is transmitted to the terminal equipment, the RRC connection establishment message including the second indication information.

S423 is implemented as follows. The RRC connection establishment completion message transmitted by the terminal equipment is received, the RRC connection establishment completion message including the measurement result.

Optionally, S421 may be implemented as follows. The RRC connection establishment completion message transmitted by the terminal equipment is received, the RRC connection establishment completion message including the first indication information.

Correspondingly, S422 is implemented as follows. An RRC reconfiguration message is transmitted to the terminal equipment, the RRC reconfiguration message including the second indication information; and S423 is implemented as follows. An RRC reconfiguration completion message transmitted by the terminal equipment is received, the RRC reconfiguration completion message including the measurement result.

Optionally, S423 may be implemented as follows. A terminal equipment dedicated message transmitted by the terminal equipment is received, the terminal equipment dedicated message including the measurement result.

Figure 8:
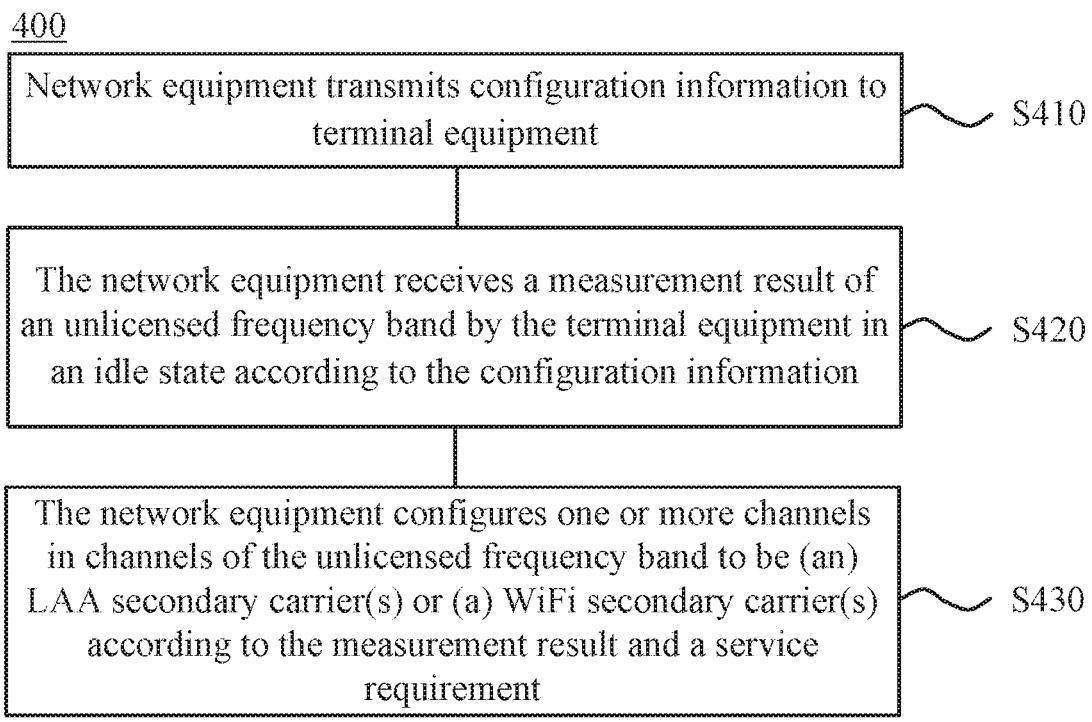
FIG. 8 is another schematic flowchart of a channel measurement and measurement result reporting method according to another embodiment of the disclosure.

Optionally, as shown in FIG. 8, the method 400 further includes the following operation.

In S430, the network equipment configures one or more channels in channels of the unlicensed frequency band to be (an) LAA secondary carrier(s) or (a) WiFi secondary carrier (s) according to the measurement result and a service requirement.

Therefore, in the embodiment of the disclosure, the network equipment transmits the configuration information to the terminal equipment, and receives the measurement result of the unlicensed frequency band by the terminal equipment in the idle state according to the configuration information. Since the terminal equipment in the idle state may measure the channel of the unlicensed frequency band, when the network equipment is required to configure the channel of the unlicensed frequency band to be the secondary carrier of the terminal equipment, the number of interaction signalings between the terminal equipment and the network equipment may be reduced, thereby reducing the signaling overhead, and increasing the access rate and access efficiency of the unlicensed frequency band channel carrier.

Figure 9:
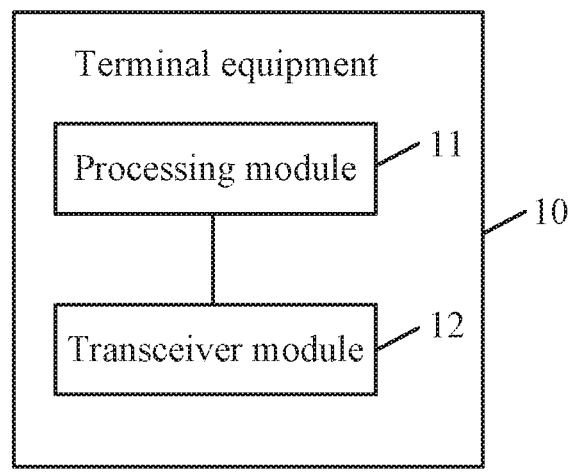
FIG. 9 is a schematic block diagram of terminal equipment according to an embodiment of the disclosure.

FIG. 9 is a schematic block diagram of terminal equipment according to an embodiment of the disclosure. As shown in FIG. 9, the terminal equipment 10 includes a processing module 11 configured to measure a channel of an unlicensed frequency band according to configuration information, wherein the terminal equipment is in an idle state; and a transceiver module 12 configured to transmit a measurement result of the unlicensed frequency band to network equipment.

Therefore, in the embodiment of the disclosure, the terminal equipment in the idle state measures the channel of the unlicensed frequency band according to the configuration information, and reports the measurement result to the network equipment. In such a manner, when the network equipment is required to configure the channel of the unlicensed frequency band to be a secondary carrier of the terminal equipment, the number of interaction signalings between the terminal equipment and the network equipment may be reduced, thereby reducing signaling overhead, and increasing an access rate and access efficiency of an unlicensed frequency band channel carrier.

In the embodiment of the disclosure, optionally, the transceiver module 12 is further configured to receive the configuration information transmitted by the network equipment.

Herein the processing module 11 is specifically configured to measure the channel of the unlicensed frequency band according to the configuration information received by the transceiver module 12 from the network equipment.

In the embodiment of the disclosure, optionally, the transceiver module 12 is specifically configured to receive a broadcast message transmitted by the network equipment, the broadcast message including the configuration information.

In the embodiment of the disclosure, optionally, the broadcast message is an SIB message.

In the embodiment of the disclosure, optionally, the transceiver module 12 is specifically configured to receive an RRC connection release message transmitted by the network equipment, the RRC connection release message including the configuration information.

Herein the processing module 11 is further configured to release an RRC connection according to the RRC connection release message.

In the embodiment of the disclosure, optionally, the configuration information is configured to indicate that the network equipment supports an LAA function, and/or, an LTE/WiFi aggregation function.

In the embodiment of the disclosure, optionally, the configuration information includes at least one of the following information: frequency information of the unlicensed frequency band, measurement period information, measurement duration information and measurement parameter information.

In the embodiment of the disclosure, optionally, the measurement parameter information includes at least one of the following parameters: RSRP, RSRQ and an RSSI.

In the embodiment of the disclosure, optionally, the transceiver module 12 is specifically configured to transmit an RRC connection establishment request message or an RRC connection establishment completion message to the network equipment, the RRC connection establishment request message or the RRC connection establishment completion message including the measurement result.

In the embodiment of the disclosure, optionally, the transceiver module 12 is specifically configured to transmit first indication information indicating that the terminal equipment stores the measurement result to the network equipment, receive second indication information transmitted by the network equipment, the second indication information being configured to indicate the terminal equipment to report the measurement result, and transmit the measurement result to the network equipment according to the second indication information.

In the embodiment of the disclosure, optionally, the transceiver module 12 is specifically configured to transmit the RRC connection establishment request message to the network equipment, the RRC connection establishment request message including the first indication information, receive an RRC connection establishment message transmitted by the network equipment, the RRC connection establishment message including the second indication information, and transmit the RRC connection establishment completion message to the network equipment, the RRC connection establishment completion message including the measurement result.

In the embodiment of the disclosure, optionally, the transceiver module 12 is specifically configured to transmit the RRC connection establishment completion message to the network equipment, the RRC connection establishment completion message including the first indication information; receive an RRC reconfiguration message transmitted by the network equipment, the RRC reconfiguration message including the second indication information; and transmit an RRC reconfiguration completion message to the network equipment, the RRC reconfiguration completion message including the measurement result.

In the embodiment of the disclosure, optionally, the transceiver module 12 is specifically configured to transmit a terminal equipment dedicated message to the network equipment, the terminal equipment dedicated message including the measurement result.

In the embodiment of the disclosure, optionally, the processing module 11 is further configured to determine whether LAA secondary carrier configuration or WiFi secondary carrier configuration is required or not according to a service requirement.

Herein the transceiver module 12 is specifically configured to, when the processing module 11 determines that LAA secondary carrier configuration or WiFi secondary carrier configuration is required, transmit the measurement result to the network equipment.

Therefore, in the embodiment of the disclosure, the terminal equipment in the idle state measures the channel of the unlicensed frequency band according to the configuration information, and reports the measurement result to the network equipment. In such a manner, when the network equipment is required to configure the channel of the unlicensed frequency band to be a secondary carrier of the terminal equipment, the number of interaction signalings between the terminal equipment and the network equipment may be reduced, thereby reducing signaling overhead, and increasing an access rate and access efficiency of an unlicensed frequency band channel carrier.

Figure 10:
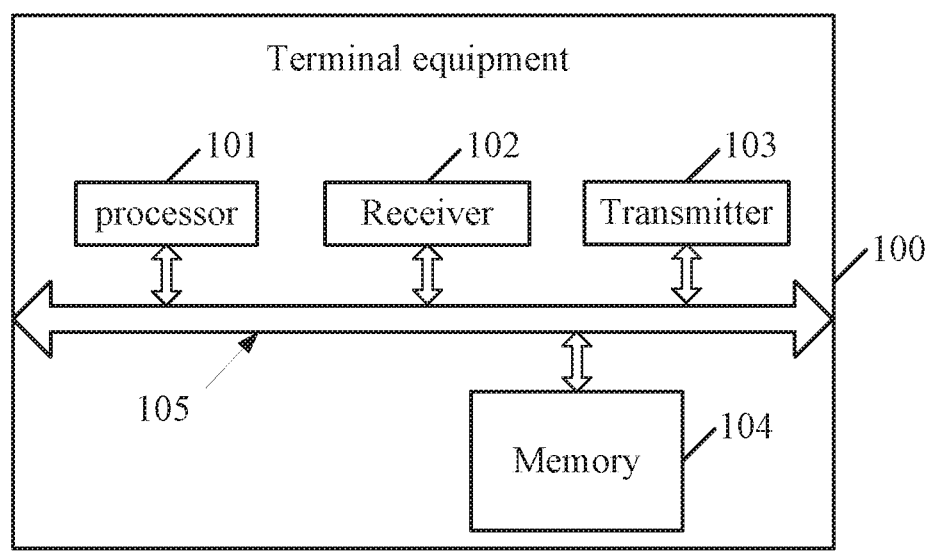
FIG. 10 is a schematic block diagram of terminal equipment according to another embodiment of the disclosure.

It is noted that, in the embodiment of the disclosure, the processing module 11 may be implemented by a processor, and the transceiver module 12 may be implemented by a receiver and a transmitter. As shown in FIG. 10, terminal equipment 100 may include a processor 101, a receiver 102, a transmitter 103 and a memory 104, wherein the memory 104 may be configured to store codes executed by the processor 101 and the like.

Respective components in the terminal equipment 100 are coupled together through a bus system 105, wherein the bus system 105 includes a data bus, and further includes a power bus, a control bus and a state signal bus.

The terminal equipment 10 shown in FIG. 9 or the terminal equipment 100 shown in FIG. 10 may implement each process implemented in the method embodiments in FIG. 1 to FIG. 3, which will not be elaborated herein for avoiding repetition.

Figure 11:
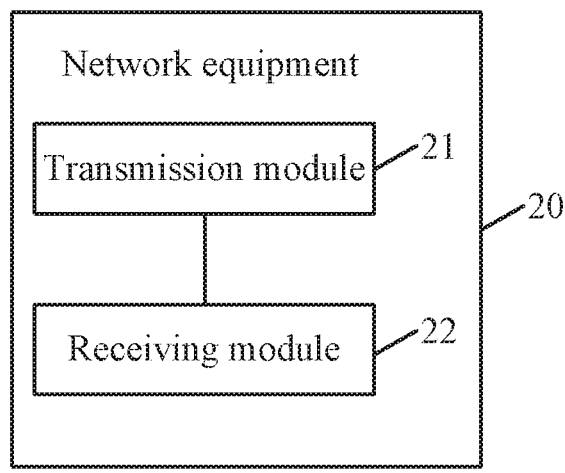
FIG. 11 is a schematic block diagram of network equipment according to an embodiment of the disclosure.

FIG. 11 is a schematic block diagram of network equipment according to an embodiment of the disclosure. As shown in FIG. 11, the network equipment 20 includes a transmission module 21 configured to transmit configuration information to terminal equipment; and a receiving module 22 configured to receive a measurement result of an unlicensed frequency band by the terminal equipment in an idle state according to the configuration information.

Therefore, in the embodiment of the disclosure, the network equipment transmits the configuration information to the terminal equipment, and receives the measurement result of measuring the channel of the unlicensed frequency band by the terminal equipment in the idle state according to the configuration information. Since the terminal equipment in the idle state may measure the channel of the unlicensed frequency band, when the network equipment is required to configure the channel of the unlicensed frequency band to be a secondary carrier of the terminal equipment, the number of interaction signaling between the terminal equipment and the network equipment may be reduced, thereby reducing signaling overhead, and increasing an access rate and access efficiency of an unlicensed frequency band channel carrier.

In the embodiment of the disclosure, optionally, the transmission module 21 is specifically configured to: transmit a broadcast message to the terminal equipment, the broadcast message including the configuration information.

In the embodiment of the disclosure, optionally, the broadcast message is an SIB message.

In the embodiment of the disclosure, optionally, the transmission module 21 is specifically configured to: transmit an RRC connection release message to the terminal equipment, the RRC connection release message including the configuration information.

In the embodiment of the disclosure, optionally, the configuration information is configured to indicate that the network equipment supports an LAA function, and/or, an LTE/WiFi aggregation function.

In the embodiment of the disclosure, optionally, the configuration information includes at least one of the following information: frequency information of the unlicensed frequency band, measurement period information, measurement duration information and measurement parameter information.

In the embodiment of the disclosure, optionally, the measurement parameter information includes at least one of the following parameters: RSRP, RSRQ and an RSSI.

In the embodiment of the disclosure, optionally, the receiving module 22 is specifically configured to receive an RRC connection establishment request message or RRC connection establishment completion message transmitted by the terminal equipment, the RRC connection establishment completion message including the measurement result.

In the embodiment of the disclosure, optionally, the receiving module 22 is specifically configured to receive first indication information indicating that the terminal equipment stores the measurement result from the terminal equipment.

The transmission module 21 is further configured to transmit second indication information to the terminal equipment, the second indication information being configured to indicate the terminal equipment to report the measurement result.

The receiving module 22 is further specifically configured to receive the measurement result transmitted by the terminal equipment according to the second indication information.

In the embodiment of the disclosure, optionally, the receiving module 22 is specifically configured to receive the RRC connection establishment request message transmitted by the terminal equipment, the RRC connection establishment request message including the first indication information.

Herein, the transmission module 21 is specifically configured to transmit an RRC connection establishment message to the terminal equipment, the RRC connection establishment message including the second indication information.

Herein the receiving module 22 is further specifically configured to receive the RRC connection establishment completion message transmitted by the terminal equipment, the RRC connection establishment completion message including the measurement result.

In the embodiment of the disclosure, optionally, the receiving module 22 is specifically configured to receive the RRC connection establishment completion message transmitted by the terminal equipment, the RRC connection establishment completion message including the first indication information.

Herein, the transmission module 21 is specifically configured to transmit an RRC reconfiguration message to the terminal equipment, the RRC reconfiguration message including the second indication information.

Herein the receiving module 22 is further specifically configured to receive an RRC reconfiguration completion message transmitted by the terminal equipment, the RRC reconfiguration completion message including the measurement result.

In the embodiment of the disclosure, optionally, the receiving module 22 is specifically configured to receive a terminal equipment dedicated message transmitted by the terminal equipment, the terminal equipment dedicated message including the measurement result.

Figure 12:
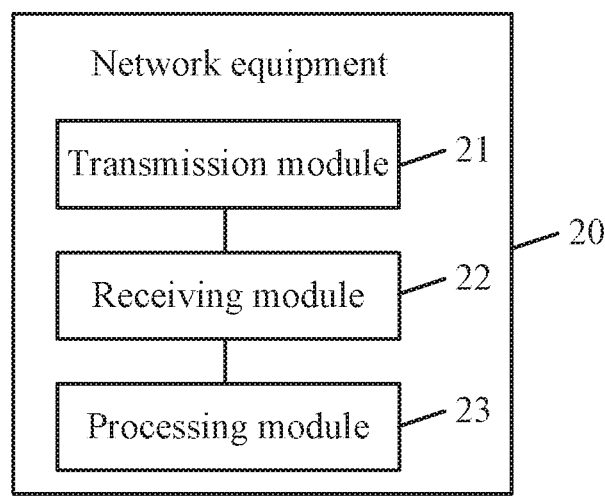
FIG. 12 is another schematic block diagram of network equipment according to another embodiment of the disclosure.

In the embodiment of the disclosure, optionally, as shown in FIG. 12, the network equipment further includes a processing module 23 configured to configure one or more channels in channels of the unlicensed frequency band to be (an) LAA secondary carrier(s) or (a) WiFi secondary carrier(s) according to the measurement result and a service requirement.

Therefore, in the embodiment of the disclosure, the network equipment transmits the configuration information to the terminal equipment, and receives the measurement result of the unlicensed frequency band by the terminal equipment in the idle state according to the configuration information. Since the terminal equipment in the idle state may measure the channel of the unlicensed frequency band, when the network equipment is required to configure the channel of the unlicensed frequency band to be the secondary carrier of the terminal equipment, the number of interaction signaling between the terminal equipment and the network equipment may be reduced, thereby reducing the signaling overhead, and increasing the access rate and access efficiency of the unlicensed frequency band channel carrier.

Figure 13:
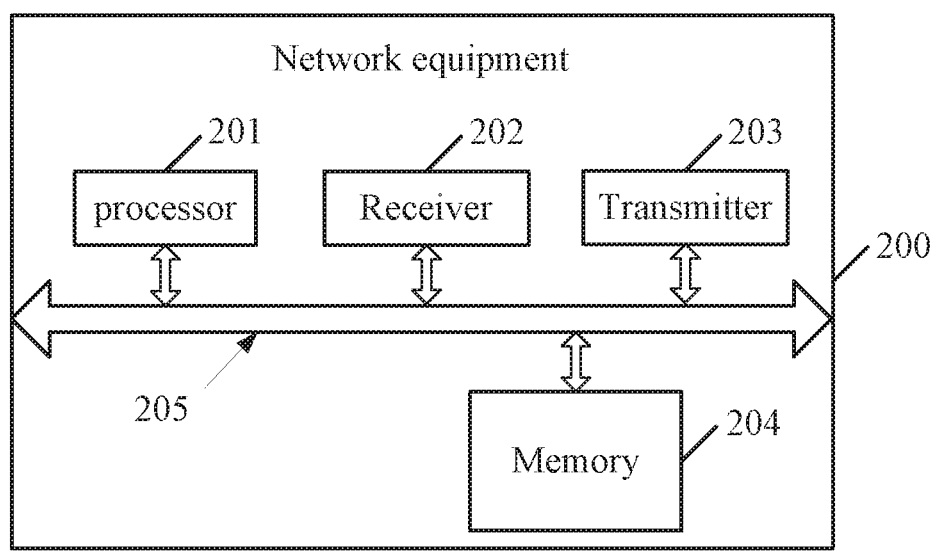
FIG. 13 is a schematic block diagram of network equipment according to yet another embodiment of the disclosure.

It is noted that, in the embodiment of the disclosure, the processing module 23 may be implemented by a processor, the transmission module 21 may be implemented by a transmitter, and the receiving module 22 may be implemented by a receiver. As shown in FIG. 13, network equipment 200 may include a processor 201, a receiver 202, a transmitter 203 and a memory 204, wherein the memory 204 may be configured to store codes executed by the processor 201 and the like.

Respective components in the network equipment 200 are coupled together through a bus system 205, wherein the bus system 205 includes a data bus, and further includes a power bus, a control bus and a state signal bus.

The network equipment 10 shown in FIG. 11 or FIG. 12 or the network equipment 200 shown in FIG. 13 may implement each process implemented in the method embodiments in FIG. 6 to FIG. 8, which will not be elaborated herein for avoiding repetition.

It should be understood that "one embodiment" or "an embodiment" mentioned in the whole specification means that specific characteristics, structures or properties related to the embodiment are included in at least one embodiment of the disclosure. Therefore, "in one embodiment" or "in an embodiment" appearing at each place of the whole specification may not always refer to the same embodiment. In addition, these specific characteristics, structures or properties may be combined in one or more embodiments in any proper manner.

It should be understood that, in each embodiment of the disclosure, a magnitude of a sequence number of each process does not mean an execution sequence, the execution sequence of each process should be determined according to its function and an internal logic, and an implementation process of the embodiment of the disclosure should not be limited.

In addition, terms "system" and "network" in the disclosure may usually be exchanged for use in the disclosure. It should be understood that term "and/or" in the disclosure only describes an association relationship of associated objects, and represents that there may exist three relationships. For example, A and/or B may represent the following three conditions: A exists independently, both A and B exist, and B exists independently. Moreover, character "/" in the disclosure usually represents that previous and latter associated objects form an "or" relationship.

It should be understood that, in the embodiments provided by the disclosure, "B corresponding to A" represents that B is associated with A and B may be determined according to A. However, it should also be understood that determining B according to A does not means that B is determined only according to A, and B may also be determined according to A and/or other information.

Those skilled in the art may realize that the units and algorithm steps of each example described in combination with the embodiments disclosed in the disclosure may be implemented by electronic hardware, computer software or a combination of the two, and for clearly describing interchangeability of hardware and software, the constitutions and steps of each example have been generally described in the above descriptions according to functions. Whether these functions are executed in a hardware or software manner depends on specific applications and design constraints of the technical solutions. Those skilled in the art may realize the described functions for each specific application by virtue of different methods, but such realization shall fall within the scope of the disclosure.

Those skilled in the art may clearly learn about that the specific working processes of the system, device and unit described above may refer to the corresponding processes in the method embodiment for convenient and brief description and will not be elaborated herein.

In some embodiments provided by the disclosure, it should be understood that the disclosed system, device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the integrated unit may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A channel measurement and measurement result reporting method, comprising:
   receiving, by terminal equipment, a broadcast message or dedicated signaling transmitted from network equipment, the broadcast message or dedicated signaling comprising configuration information, wherein the broadcast message is a System Information Block (SIB) message, or the dedicated signaling is a signaling used for releasing connection of the terminal equipment to switch from the connection state into the idle state of the terminal equipment;
   measuring, by the terminal equipment, a channel of an unlicensed frequency band according to the configuration information, wherein the terminal equipment is in an idle state; and
   transmitting, by the terminal equipment, a measurement result of the unlicensed frequency band to the network equipment when the terminal equipment is in a connection state,
   wherein the SIB message comprises the configuration information in the following manner: introducing a new SIB message different from the SIB message and including corresponding to an Information Element (IE) corresponding to the configuration information,
   wherein the configuration information comprises frequency information of the unlicensed frequency band, measurement period information, measurement duration information and a measurement parameter, and
   wherein measuring, by the terminal equipment, the channel of the unlicensed frequency band according to the configuration information comprises:
   measuring, by the terminal equipment, a measurement parameter in a measurement duration on a carrier frequency in the configuration information according to a measurement period in the configuration information, the measurement period comprising a variable measurement duration.

2. The method according to claim 1, wherein the configuration information is configured to indicate that the network equipment supports a License Assisted Access (LAA) function, and/or, a Long Term Evolution (LTE) and Wireless Fidelity (WiFi) aggregation function.

3. The method according to claim 1, wherein transmitting the measurement result of the unlicensed frequency band to the network equipment when the terminal equipment is in the connection state comprises:

transmitting a Radio Resource Control (RRC) connection establishment request message or an RRC connection establishment completion message to the network equipment, the RRC connection establishment request message or the RRC connection establishment completion message comprising the measurement result.

4. The method according to claim 1, wherein transmitting the measurement result of the unlicensed frequency band to the network equipment when the terminal equipment is in the connection state comprises:
transmitting first indication information indicating that the terminal equipment stores the measurement result to the network equipment;
receiving second indication information transmitted by the network equipment, the second indication information configured to indicate the terminal equipment to report the measurement result; and
transmitting the measurement result to the network equipment according to the second indication information.

5. The method according to claim 4, wherein transmitting the first indication information indicating that the terminal equipment stores the measurement result to the network equipment comprises:
transmitting the RRC connection establishment request message to the network equipment, the RRC connection establishment request message comprising the first indication information,
wherein receiving the second indication information transmitted by the network equipment comprises:
receiving an RRC connection establishment message transmitted by the network equipment, the RRC connection establishment message comprising the second indication information,
wherein transmitting the measurement result to the network equipment according to the second indication information comprises:
transmitting the RRC connection establishment completion message to the network equipment, the RRC connection establishment completion message comprising the measurement result.

6. The method according to claim 4, wherein transmitting the first indication information indicating that the terminal equipment stores the measurement result to the network equipment comprises:
transmitting the RRC connection establishment completion message to the network equipment, the RRC connection establishment completion message comprising the first indication information,
wherein receiving the second indication information transmitted by the network equipment comprises:
receiving an RRC reconfiguration message transmitted by the network equipment, the RRC reconfiguration message comprising the second indication information,
wherein transmitting the measurement result to the network equipment according to the second indication information comprises:
transmitting an RRC reconfiguration completion message to the network equipment, the RRC reconfiguration completion message comprising the measurement result.

7. The method according to claim 4, wherein transmitting the measurement result to the network equipment according to the second indication information comprises:
transmitting a terminal equipment dedicated message to the network equipment, the terminal equipment dedicated message comprising the measurement result.

8. The method according to claim 1, wherein transmitting the measurement result of the unlicensed frequency band to the network equipment when the terminal equipment is in the connection state comprises:
determining, by the terminal equipment, whether LAA secondary carrier configuration or WiFi secondary carrier configuration is required or not according to a service requirement; and
when it is determined that the LAA secondary carrier configuration or the WiFi secondary carrier configuration is required, transmitting the measurement result to the network equipment.

9. The method according to claim 1, wherein the measurement parameter comprises a Received Signal Strength Indicator (RSSI), and the measurement duration is configured according to a comparison result of a previous RSSI measurement result with respect to a threshold value.

10. A channel measurement and measurement result reporting method, comprising:
transmitting, by network equipment, a broadcast message or dedicated signaling to the terminal equipment, the broadcast message or dedicated signaling comprising configuration information, wherein the broadcast message is a System Information Block (SIB) message, or the dedicated signaling is a signaling used for releasing connection of the terminal equipment to switch from the connection state into the idle state of the terminal equipment; and
receiving, by the network equipment, a measurement result of an unlicensed frequency band measured by the terminal equipment in an idle state according to the configuration information and transmitted by the terminal equipment in a connection state,
wherein the SIB message comprises the configuration information in the following manner: introducing a new SIB message different from the SIB message and including corresponding to an Information Element (IE) corresponding to the configuration information,
wherein the configuration information comprises frequency information of the unlicensed frequency band, measurement period information, measurement duration information and a measurement parameter, the measurement period comprising a variable measurement duration.

11. The method according to claim 10, wherein the broadcast message is a System Information Block (SIB) message, or the dedicated signaling is a signaling used for releasing connection of the terminal equipment to switch from the connection state into the idle state of the terminal equipment.

12. The method according to claim 10, wherein the configuration information is configured to indicate that the network equipment supports a License Assisted Access (LAA) function, and/or, a Long Term Evolution (LTE) and Wireless Fidelity (WiFi) aggregation function.

13. The method according to claim 10, wherein receiving the measurement result of the unlicensed frequency band by the terminal equipment in the idle state according to the configuration information comprises:
receiving a Radio Resource Control (RRC) connection establishment request message or RRC connection establishment completion message transmitted by the terminal equipment, the RRC connection establishment request message or the RRC connection establishment completion message comprising the measurement result.

14. The method according to claim 10, wherein receiving the measurement result of the unlicensed frequency band by the terminal equipment in the idle state according to the configuration information comprises:
- receiving first indication information indicating that the terminal equipment stores the measurement result from the terminal equipment;
- transmitting second indication information to the terminal equipment, the second indication information configured to indicate the terminal equipment to report the measurement result; and
- receiving the measurement result transmitted by the terminal equipment according to the second indication information.

15. The method according to claim 14, wherein receiving the first indication information indicating that the terminal equipment stores the measurement result from the terminal equipment comprises:
- receiving the RRC connection establishment request message transmitted by the terminal equipment, the RRC connection establishment request message comprising the first indication information,
- wherein transmitting the second indication information to the terminal equipment comprises:
- transmitting an RRC connection establishment message to the terminal equipment, the RRC connection establishment message comprising the second indication information,
- wherein receiving the measurement result transmitted by the terminal equipment according to the second indication information comprises:
- receiving the RRC connection establishment completion message transmitted by the terminal equipment, the RRC connection establishment completion message comprising the measurement result.

16. The method according to claim 14, wherein receiving the first indication information indicating that the terminal equipment stores the measurement result from the terminal equipment comprises:
- receiving the RRC connection establishment completion message transmitted by the terminal equipment, the RRC connection establishment completion message comprising the first indication information,
- wherein transmitting the second indication information to the terminal equipment comprises:
- transmitting an RRC reconfiguration message to the terminal equipment, the RRC reconfiguration message comprising the second indication information,
- wherein receiving the measurement result transmitted by the terminal equipment according to the second indication information comprises:
- receiving an RRC reconfiguration completion message transmitted by the terminal equipment, the RRC reconfiguration completion message comprising the measurement result.

17. The method according to claim 16, wherein receiving the measurement result transmitted by the terminal equipment in the idle state according to the second indication information comprises:
- receiving a terminal equipment dedicated message transmitted by the terminal equipment, the terminal equipment dedicated message comprising the measurement result.

18. The method according claim 10, further comprising:
- configuring, by the network equipment, one or more channels in channels of the unlicensed frequency band to be (an) LAA secondary carrier(s) or (a) WiFi secondary carrier(s) according to the measurement result and a service requirement.

19. Terminal equipment, comprising:
- a receiver, configured to receive a broadcast message or dedicated signaling transmitted from network equipment, the broadcast message or dedicated signaling comprising configuration information, wherein the broadcast message is a System Information Block (SIB) message, or the dedicated signaling is a signaling used for releasing connection of the terminal equipment to switch from the connection state into the idle state of the terminal equipment;
- a processor configured to measure a channel of an unlicensed frequency band according to the configuration information, wherein the terminal equipment is in an idle state; and
- a transmitter, configured to transmit a measurement result of the unlicensed frequency band to the network equipment when the terminal equipment is in a connection state,
- wherein the SIB message comprises the configuration information in the following manner: introducing a new SIB message different from the SIB message and including corresponding to an Information Element (IE) corresponding to the configuration information,
- wherein the configuration information comprises frequency information of the unlicensed frequency band, measurement period information, measurement duration information and a measurement parameter, and
- wherein the processor is further configured to:
- measure a measurement parameter in a measurement duration on a carrier frequency in the configuration information according to a measurement period in the configuration information, the measurement period comprising a variable measurement duration.

* * * * *